US012768598B2

(12) United States Patent
Maggioli et al.

(10) Patent No.: US 12,768,598 B2
(45) Date of Patent: Oct. 20, 2026

(54) EXCHANGEABLE COOLED NOSE WITH CERAMIC INJECTOR PASSAGE

(71) Applicant: PAUL WURTH S.A., Luxembourg (LU)

(72) Inventors: Nicolas Maggioli, Thionville (FR); Klaus Peter Kinzel, Sandweiler (LU); Gilles Kass, Sanem (LU)

(73) Assignee: PAUL WURTH S.A., Luxembourg (LU)

( * ) Notice: Subject to any disclaimer, the term of this patent is extended or adjusted under 35 U.S.C. 154(b) by 649 days.

(21) Appl. No.: 18/025,048

(22) PCT Filed: Sep. 22, 2021

(86) PCT No.: PCT/EP2021/076014
§ 371 (c)(1),
(2) Date: Mar. 7, 2023

(87) PCT Pub. No.: WO2022/063805
PCT Pub. Date: Mar. 31, 2022

(65) Prior Publication Data

US 2023/0324121 A1 Oct. 12, 2023

(30) Foreign Application Priority Data

Sep. 28, 2020 (LU) ........................................ 102096

(51) Int. Cl.
*F27D 3/16* (2006.01)
*F27B 1/24* (2006.01)
*F27D 1/12* (2006.01)

(52) U.S. Cl.
CPC .................. *F27D 3/16* (2013.01); *F27B 1/24* (2013.01); *F27D 1/12* (2013.01); *F27D 2003/166* (2013.01)

(58) Field of Classification Search
CPC ........ F27D 3/16; F27D 1/12; F27D 2003/166; F27D 99/0033; F27B 1/24; C21B 7/16; C21B 7/10
(Continued)

(56) References Cited

U.S. PATENT DOCUMENTS 3,061,300 A 10/1962 Schultz
3,722,871 A * 3/1973 Greaves .................... C21B 7/16 432/99
(Continued)

FOREIGN PATENT DOCUMENTS

CN 101023188 A 8/2007
CN 102089609 A 6/2011
(Continued)

OTHER PUBLICATIONS

International Search Report for corresponding application PCT/EP2021/076014 filed Sep. 22, 2021; Mail date Oct. 13, 2021.
(Continued)

*Primary Examiner* — Jessee R Roe
*Assistant Examiner* — Michael Aboagye
(74) *Attorney, Agent, or Firm* — CANTOR COLBURN LLP

(57) ABSTRACT

A gas injection system for a blast furnace or shaft furnace or metallurgical furnace comprising a furnace wall and a cooling plate wherein the gas injection system comprises a gas distribution pipe, one or more injectors having a nozzle, where the nozzle comprises a ceramic insert, where the cooling element has a hot side, turned away from the furnace wall, where a protrusion is attached to the hot side of said cooling plate, where the ceramic insert traverses the furnace wall and the cooling plate and the protrusion on cooling plate and where the ceramic inserts have an adaptable length so that they either protrude inside the furnace, or that they
(Continued)

are flush with a hot face of the cooling plate or stay slightly in retreat with a hot face of the cooling plate.

14 Claims, 4 Drawing Sheets

(58) Field of Classification Search
USPC .......... 266/265, 270, 280, 197; 75/551–557; 110/182.5
See application file for complete search history.

(56) References Cited

U.S. PATENT DOCUMENTS

| | | | | |
|---|---|---|---|---|
| 4,374,585 | A | 2/1983 | Papst | |
| 5,451,034 | A * | 9/1995 | Ulveling | C21B 5/003 75/460 |
| 6,289,035 | B1 | 9/2001 | Shver | |
| 7,722,800 | B2 | 5/2010 | Williams | |
| 8,480,951 | B2 * | 7/2013 | Matsumura | F27B 1/16 266/47 |
| 8,808,616 | B2 * | 8/2014 | Simoes | C21B 7/163 110/182.5 |
| 2011/0253017 | A1 | 10/2011 | Simoes et al. | |

FOREIGN PATENT DOCUMENTS

| | | | | |
|---|---|---|---|---|
| CN | 110093465 | A | 8/2019 | |
| CN | 110252069 | A | 9/2019 | |
| EP | 0091423 | B1 | 5/1986 | |
| EP | 0639750 | A1 * | 2/1995 | F23C 5/02 |
| EP | 2208952 | A1 | 7/2010 | |
| EP | 2848705 | A1 | 3/2015 | |
| EP | 3486335 | A1 | 5/2019 | |
| GB | 2069114 | A | 8/1981 | |
| JP | S53137106 | U | 10/1978 | |
| KR | 20040018442 | A | 3/2004 | |
| RU | 144987 | U1 | 9/2014 | |
| TW | 201842295 | A | 12/2018 | |
| WO | 2008136027 | A1 | 11/2008 | |

OTHER PUBLICATIONS

Written Opinion for corresponding application PCT/EP2021/076014 filed Sep. 22, 2021; Mail date Oct. 13, 2021.

Taiwan Office Action Patent Application No. 110135568; Report dated Feb. 18, 2025.

European Search Report for corresponding application EP21770285.1; Mail date Feb. 21, 2025.

European Search Report for corresponding application EP21770285.1; Report dated Mar. 28, 2024.

Chinese Office Action; Application No. 2021800661252; date of mailing: Sep. 23, 2025; 13 pages.

Korean Office Action for corresponding application 9-5-2026-042349231 Dated May 8, 2026.

* cited by examiner

EXCHANGEABLE COOLED NOSE WITH CERAMIC INJECTOR PASSAGE

TECHNICAL FIELD

The present disclosure generally relates to the field of iron metallurgy. The disclosure more specifically relates to an injector system of a gas distribution to be fitted to the shaft or stack or to the zone above the belly of an existing shaft of a blast furnace, a shaft furnace or a metallurgical furnace.

BACKGROUND

With the Paris Agreement and near-global consensus on the need for action on emissions, it is imperative that each industrial sector looks into the development of solutions towards improving energy efficiency and decreasing $CO_2$ output.

One technology developed to reduce the carbon footprint during steel production is the so-called "shaft injection" wherein hot gases (mainly CO and $H_2$) are injected in the upper part of the blast furnace, in the part that is generally protected on the inside by cooling plates (cooling elements) or staves or plate coolers or a refractory lining.

This injection of hot gas in a blast furnace or in a shaft furnace at the level of the shaft (shaft injection) is cited in many publications and disclosures, but an industrial application has not yet been implemented on a commercial blast furnace.

EP 0 639 750 A1 discloses a device (8) for mounting a burner (6) in a cooling panel (4) of an electric arc furnace (2) includes a cast copper body containing a burner aperture (12), a cooling water manifold (16) and a frusto-conical outer surface (50) which is adapted to fit snugly into a complementary aperture in the cooling panel (4). A convex upper surface (38) of the device acts to shed scrap falling down an inner face of the cooling panel (4) both laterally away from the device and inwardly towards the furnace interior 10. The tapered fit between the device (8) and the cooling panel (4) minimizes leakage and facilitates separation.

EP 2 848 705 A1 describes a tuyere structure in a blast furnace prevents gas leakage and keeps a position of an end of a tuyere at a predetermined position in a furnace body while absorbing a difference in thermal deformation between the furnace body and a bustle pipe. The tuyere structure (20) in a blast furnace includes: a blowpipe (31) fixed to a furnace shell (21); a tuyere (32) fixed to an end of the blowpipe (31); and a flexible joint (34) that connects the blowpipe 31 to a tuyere stock (33). A tuyere stave-cooler (23) is provided inside the furnace shell (21) around the tuyere (32) to form an inner surface of the blast furnace.

One challenge is to increase the durability and versatility of the injectors which operate in an aggressive gas atmosphere, in abrasive conditions due to solid material flow at very high temperatures and in a dusty environment.

BRIEF SUMMARY

The disclosure provides gas injectors that withstand these very high temperatures and that can be retrofitted to the cooling plates of a blast furnace or shaft furnace or metallurgical furnace.

The present disclosure provides injecting points that can be easily retrofitted to existing cast iron or copper cooling plates or staves.

More particularly, the present disclosure relates to a gas injection system for a blast furnace or shaft furnace or metallurgical furnace comprising a furnace wall and a cooling plate wherein the gas injection system comprises

- a gas distribution pipe
- one or more injectors having a nozzle
- characterized in that the nozzle comprises a ceramic insert,
- wherein the cooling plate or cooling element has a hot side, facing away from the furnace wall, wherein a protrusion is attached to the hot side of said cooling plate,
- wherein the nozzle traverses the furnace wall and the cooling plate and the protrusion on cooling plate and
- wherein the ceramic inserts have an adaptable length so that they either protrude inside the furnace, or that they are flush with a hot face of the cooling plate or stay slightly in retreat with a hot face of the cooling plate.

The present disclosure provides a gas injection system for the injection of a mixture comprising CO and $H_2$ in a furnace at the level of the cooling plates to further increase productivity, decrease operating costs, reduce coke consumption and $CO_2$ emissions in the blast furnace process.

The gas injectors with a nozzle as described herein can easily withstand these very high temperatures and can be retrofitted to the cooling plates of a blast furnace or shaft furnace or metallurgical furnace.

The gas injectors with a nozzle as described herein allow obtaining a high gas tightness, which is particularly important in this application as the hot gas contains CO and $H_2$, which may spontaneously inflame when leaking to the outside or may form an explosive atmosphere when mixed with air.

The protrusion attached to the hot side of said cooling element protects the cooling plate from the injected hot gas so that the cooling plate can remain in the furnace longer.

The protrusion can have the width of the cooling element, providing then a peripheral continuity if all cooling elements are equipped.

Depending on the location onto the cooling element and the row of cooling element concerned, the protrusion can extend to the upper edge of the cooling element to make the transition with the upper row of cooling elements. The preferred case is the rows of transition between copper and cast iron staves where a step in the BF profile may exist already.

The protrusion attached to the hot side of said cooling element protects the cooling element from the burden descent which will be perturbed by the injected gas.

The protrusion hot face can be parallel to the cooling element but not necessarily, the upper side of the protrusion can be horizontal to support a stagnant zone or inclined to make a smooth transition. The lower side of the protrusion can be horizontal or have recesses to create a void in the burden and ease the gas penetration, or inclined to make a smooth transition.

Advantageously, the protrusion is actively cooled by one or more cooling passage (either pipe or channel).

The protrusion may be cooled by its own cooling system or through a cooling system used to cool the cooling elements at the location it will be installed.

On the other hand, the protrusion may be passively cooled, through the contact with the cooling plate by use of conductive material in contact with the cooling element.

In an embodiment, the nozzle comprises a ceramic insert.

In an embodiment, the system comprises a multitude of injectors having a nozzle comprising each a ceramic insert, wherein the ceramic insert have different diameters.

In an embodiment, each ceramic insert is accessible via a flange connecting port on the furnace wall that allows easy maintenance and inspection.

The injector may be oriented perpendicular or tangentially to the furnace wall. Preferably, the angle of the injector is between 90° (perpendicular) and 60° (tangential); more preferably, the angle of the injector is between 90° (perpendicular) and 60° (tangential).

Alternative to ceramic injectors, cooled injector that will be either cylindrical or conical, matching the hole made in the protrusion can be used.

The gas distribution pipe may comprise between 20 and 100 injectors, preferably between 20 and 50.

The injectors respectively the ceramic inserts have a length so that they protrude inside the furnace, or that they are flush with a hot face of the cooling plates or stay slightly in retreat with a hot face of the cooling plates.

The injector may be oriented perpendicular or tangentially to the furnace wall.

The injection may be inclined with the cooling element in such a way the injector tip is in the lower side of the protrusion.

The disclosure also concerns a metallurgic plant for producing iron products, comprising a blast furnace, a shaft furnace or a metallurgical furnace and at least one gas injection system as described herein.

Ceramic inserts in the context of the present disclosure can be made of, consists of or comprise: oxides like alumina, beryllia, ceria, zirconia or non-oxides like carbide, boride, nitride, silicide or composite materials like particulate reinforced, fiber reinforced, combinations of the above oxides and non-oxides.

The present disclosure can be implemented with existing equipment well known in the metallurgical field.

BRIEF DESCRIPTION OF THE DRAWINGS

Further details and advantages of the present disclosure will be apparent from the following detailed description of not limiting embodiments with reference to the attached drawings, wherein.

In the Figures, unless otherwise indicated, same or similar elements are designated by same reference signs.

DETAILED DESCRIPTION OF PREFERRED EMBODIMENTS

Figure 1:
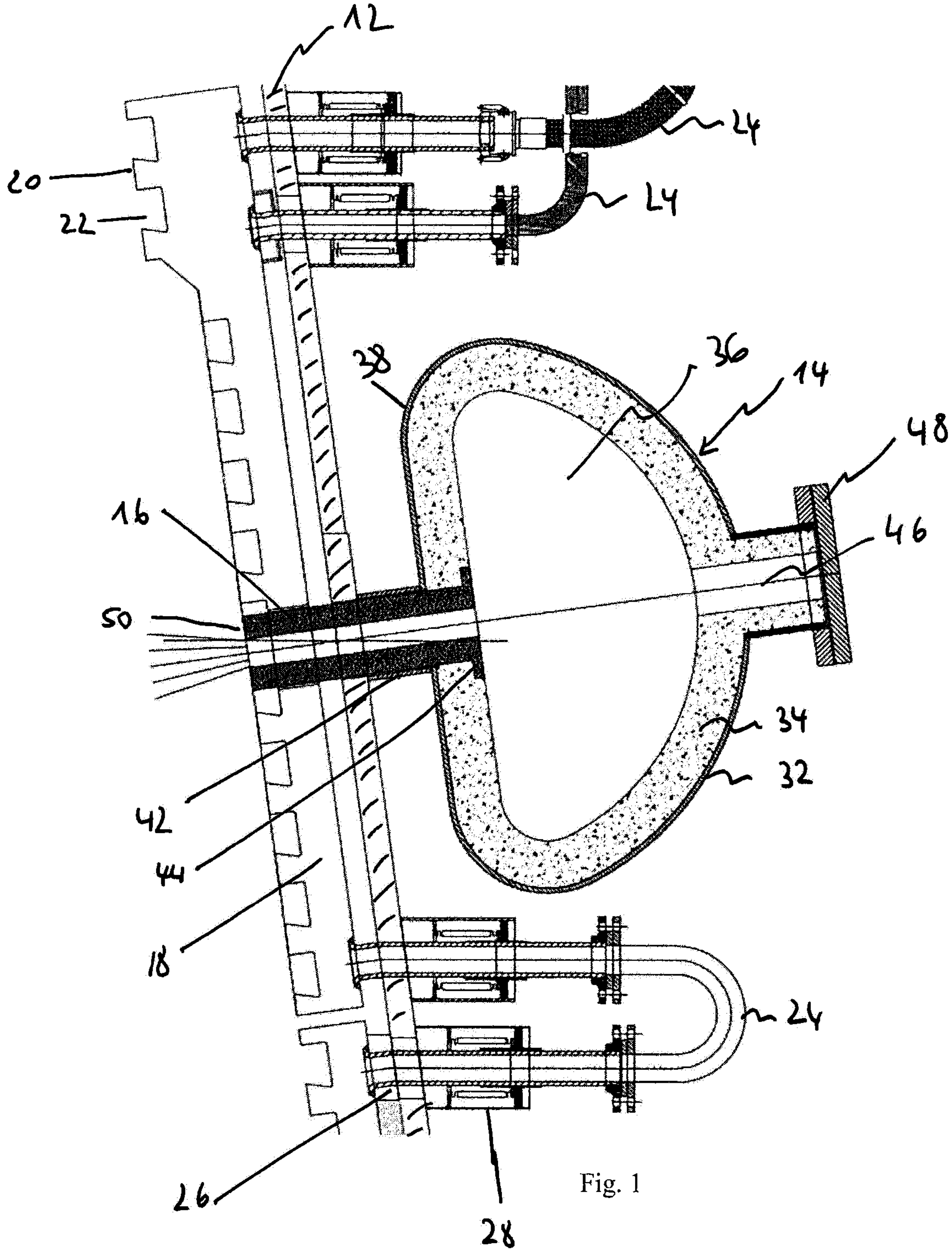
FIG. 1 is a sectional view of a cooling assembly and a gas injection system with a first preferred embodiment.

FIG. 1 shows a sectional view of blast furnace or shaft furnace or metallurgical furnace at the height of the cooling plates according to a first embodiment.

On FIG. 1, the blast furnace or shaft furnace or metallurgical furnace wall 12 or shell comprises on the one side (exterior, cold side of the furnace) a gas distribution pipe 14 with an injector 16.

On the other side (interior, hot side) of the furnace wall 12, there is a cooling assembly, comprising a cooling plate 18 or stave made of cast iron, copper or a copper alloy. The cooling plate 18 is disposed inside of a furnace wall 12 of the furnace. One surface of the cooling plate 18 (turned towards the hot side of the furnace) comprises a plurality of ribs 20 and grooves 22 to increase the surface area. Also, it could be provided with a refractory lining, which is not shown here for sake of simplicity. A plurality of coolant channels (not shown) is/are provided in the cooling plate 18.

The cooling assembly also comprises a plurality of cooling pipes 24, each of which has a pipe channel (not shown) that is connected to a cooling channel (not shown). The cooling pipe 24 can be made of the same material as the cooling plate 18. Each of the cooling pipes 24 passes through a wall opening 26 in the furnace wall 12. The cross-section of the respective wall opening 26 is chosen to be larger than the cross-section of the respective cooling pipe 24 to allow for some movement of the cooling pipe 24 with respect to the furnace wall 12. Such movement may in particular result from a thermally induced deformation of the cooling plate 18, to which the cooling pipes 24 are attached.

A compensator may be connected to the furnace wall 12 so that it covers the wall openings 26. The hood 28 has a hood opening through which a cooling pipe 24 is passed. The hood 28 may be covering more than one wall opening. Such a hood then comprises more than one hood opening, one for each cooling pipe 24. On an outer side of the hood 28, the cooling pipe 24 is surrounded by a compensator, which is welded to the hood 28 so that it is connected to hood opening. The structure of the compensators comprises a cylindrical portion that is connected by welding to the hood 28. A bellows is connected to the cylindrical portion by a ring portion. An annular sleeve portion is connected on the one hand to the bellows and on the other hand to the outside of the cooling pipe. The connection to the cooling pipe 24 is established through an annular first weld. An important feature of the compensator is that the sleeve portion has an inner diameter that increases towards the furnace wall, i.e. it increases from an outer end towards an inner end. In other words, the inside surface of the sleeve portion is not cylindrical but conical. This allows for different angular orientations of the sleeve portion with respect to the cooling pipe 24, while still minimising the distance between the sleeve portion and the cooling pipe 24 at the outer end, where the first weld is applied.

FIG. 1 also shows a preferred gas injection system comprising a gas distribution pipe 14 and one or more injectors 16. However, traditional bustle pipe system and tuyere stock are possible and present other interest The gas distribution pipe 14 comprises a steel shell 32 and an insulation layer 34 made of one or several layers of insulating and dense refractory material. The refractory lining is designed to resist to the high temperature and the composition of the gas circulating in the hollow part 36 of the gas distribution pipe 14. The refractory lining also insulates the steel shell 32 from the hot gases circulating in the hollow space 36 and protects the steel shell 32 of the gas distribution pipe 14 from the high temperature. The insulating effect of the refractory lining allows reducing thermal losses.

The gas used to inject comprises mainly CO and $H_2$. Typically the gas has the following composition 20-35% v/v CO, 35-55% v/v $H_2$, 5-25% v/v $N_2$, 2-5% v/v $CO_2$.

The gas distribution pipe 14 of FIG. 1 has a D shaped cross-section wherein the flat side 38 of the D shaped cross-section faces the furnace wall 12. It is also possible to use other geometries (rectangular, triangular, hexagonal etc.), as long as there is a flat face facing towards the furnace wall. The injector 16 is integrated into the flat side 38 of the furnace wall 12 and traverses, on the one side, the steel shell 32 and the insulating layer 34 of the gas distribution pipe 14 and, on the other side, the furnace wall 12 and the cooling plate 18.

The injector 16 is integrated into the gas distribution pipe 14 and connects the gas distribution pipe 14 to the interior of the furnace through the furnace wall 12 and the cooling plate 18. The injector 16 is the only element that fluidly connects the gas distribution pipe 14 to the furnace.

The absence of multiple connections between the gas distribution pipe 14 and the injectors 16 will also reduce the potential sources for gas leakage as there are fewer connections and transitions. Indeed, in the present system, the injector 16 is connected directly—without any additional joints or intermediary pieces—to the gas distribution pipe 14. Gas tightness is particularly important in this application as the hot gas contains CO and $H_2$, which may spontaneously inflame when leaking to the outside or may form an explosive atmosphere when mixed with air.

In the case shown on FIG. 1, the injector passes through a short section of a steel pipe 42 which is connected to the steel shell 32 of the gas distribution pipe 14 and to the furnace wall 12. This steel pipe 42 enhances the stability of the connection between the gas distribution pipe 14 and the furnace wall 12 and protects the injector 16. The gas distribution pipe 14 is thus at a certain distance from the furnace wall 12. This distance is preferably between 10 and 50 cm.

The injector 16 is preferably made of a suitable temperature resistant material, like a ceramic material, preferably an oxide ceramic material or a silicon infiltrated silicon carbide material or a nitride based ceramic material. Such materials are chosen to withstand wear caused by the dust laden, hot gas and corrosion by the hot reducing gas. The injector 16 may be provided with water cooling.

The injector 16 is preferably anchored in the insulating layer 34 of the gas distribution pipe 14 with a ring structure 44 that extends perpendicularly to the axis 46 of the injector 16. The ring structure is flush with the inside of the insulation layer 34 of the gas distribution pipe 14.

On the opposite side of the injector 16, i.e. on the rounded side 40 of the D section, and in the axis of the injector is integrated a maintenance and inspection port 48. This allows easy dismantling of each injector 16 and easy exchange of the injector 16 in case it is worn out or damaged. The easy dismantling of the injectors 16 is also an advantage for routine inspections of the injecting area inside the furnace during maintenance stops of the furnace. After the injector 16 has been removed, there is an easy access for inspection and possibly cleaning or removal of scaffolds around the injection port 50.

The injectors 16 can be oriented towards the centre of the furnace or oriented tangentially (not shown). The tangential orientation helps to create a swirl flow in the furnace, which helps increase the distribution of the gas, the mixing with the ascending gas from tuyere level and increases the residence time of the gas in the furnace increasing thus gas utilisation.

A large number of injectors 16, typically 20 to 80, preferably up to 100 or even up to 150 can be foreseen as the traditional, cumbersome and bulky, multiple connections between the main gas distributor and the injectors are avoided. Installing such a large number of injectors 16 was impossible with the traditional systems due to related congestion of the area outside the furnace. A large number of injectors 16 is beneficial for a good distribution of the hot gas inside the furnace, which is important for an efficient use of the gas in the furnace process.

When installing a large number of injectors, the diameter of the individual injectors and the corresponding nozzles (not shown) can be quite small. Typically, the inner diameter ranges from 3-20 cm, preferably 5-10 cm, whereas the outer diameter ranges from 5-25 cm, preferably 8-15 cm. This allows keeping the openings in the furnace wall and cooling plates 18 small as well as ensuring easy retrofitting of this solution on an existing furnace without changing the cooling plates.

The length of the injectors is adaptable: they can protrude inside the furnace (typically 5 to 10 cm), they can be flush with the hot face of the plates or they can stay slightly in retreat (typically 2 to 10 cm) with the hot face of the cooling plates.

It is also important to note that the gas distribution pipe 14 does not need to be a closed, peripheral collector as for the traditional bustle pipe. If space is not available in a given furnace environment, the gas distribution 14 may be interrupted and a section of the furnace circumference may be devoid of gas distribution pipe and of injectors. The gas distribution pipe 14 can be divided in several portions located around the furnace (e.g. 4 quadrants), each portion being supplied by individual hot reducing gas supply lines (not shown).

Figure 2:
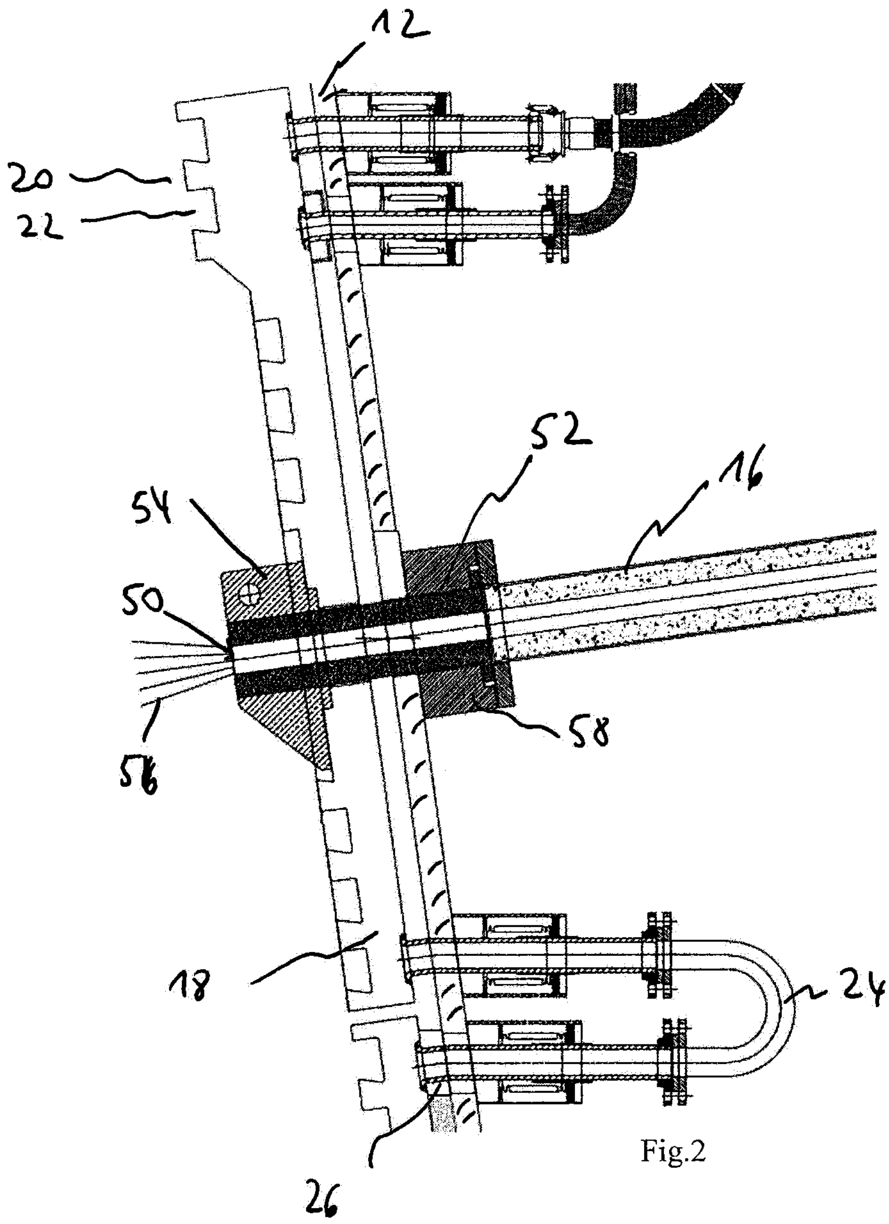
FIG. 2 is a sectional view of a cooling assembly and a gas injection system with a second preferred embodiment.

FIG. 2 shows a sectional view of a preferred embodiment of a gas injection system.

In this particular embodiment, the injector has a particular nozzle that is used to assure the passage through the furnace wall 12 and the cooling element 18. The nozzle comprises a ceramic tip insert 52 that assures the passage of the hot gas from the outside the furnace wall 12 to the hot side of the cooling plate 18. It is preferably a ceramic tip insert 52 that has an insulating effect that allows protecting the furnace wall 12 and cooling plate 18 from the high temperature gas that is injected into the furnace. It can however also be a cooled element.

The ceramic insert 52 allows a certain adaptability of the gas injection system 10, as different diameters can be used so that gas injection system 10 can be adapted to the given process conditions. Ceramic inserts 52 with smaller interior diameters will increase the gas velocity and thus the penetration depth of the gas in the furnace.

A protrusion or "nose" 54 may be easily retrofitted on the hot surface of the existing cooling plates 18 which is perforated at different positions to assure the passage of the ceramic nozzle 52 and the hot gas 56.

The size of the protrusion 54 can vary depending on the exact location in the furnace and the number of ceramic inserts that it houses. Generally speaking the protrusions can be between 1 cm and 40 cm long, 10 cm and 120 cm wide 10 cm and 100 cm height.

The injection port 50 or "outlet" can be in the face turned towards the inside of the furnace, in the upper or lower face of the protrusion 54 so that the hot gas 56 can be made to hit areas where the burden in the blast furnace has the larger porosity and thus maximises the penetration of hot gas 56.

The protrusion 54 is passively cooled by conduction of the cooling plate 18 to which it is attached. This ensures protection of the cooling plate 18 in the area of the injection point and limits exposure of the cooling plate 18 to the local high temperature due to the injection of the hot gas 52 at gas temperature of 850-950° C.

Depending on the area of implementation, the protrusion 54 can be cooled by its own cooling system.

Each ceramic insert 52 is accessible via a connecting port 58 on the outside of the furnace wall 12 that allows easy maintenance and inspection. The ceramic nozzle 52 can be dismantled and easily exchanged in case it is worn out or damaged. The easy dismantling of the ceramic nozzles 52 is also an advantage for routine inspections of the injecting area inside the furnace during maintenance stops of the blast furnace. The removal of the ceramic nozzles 52 provides easy access for inspection and possibly cleaning or removal of scaffolds around the injection port 50.

Another advantage is that in a furnace cooled by cooling plates, the injection points or ceramic nozzles can be positioned on several levels in different configurations:

Continuous belt of protrusions on two or more levels

Intermittent arrangement on two or more levels offset to create a staggered arrangement of protrusions.

When installing a large number of injectors, the diameter of the individual injectors can be quite small. This allows keeping the openings in the furnace wall and cooling plates as small as well, ensuring easy retrofitting of this solution on an existing blast furnaces, shaft furnaces and metallurgical furnaces without changing the cooling elements.

The length and diameter of the nozzles is adaptable: they can protrude inside the furnace, be flush with the hot face of the cooling plates or stay slightly in retreat.

Figure 3:
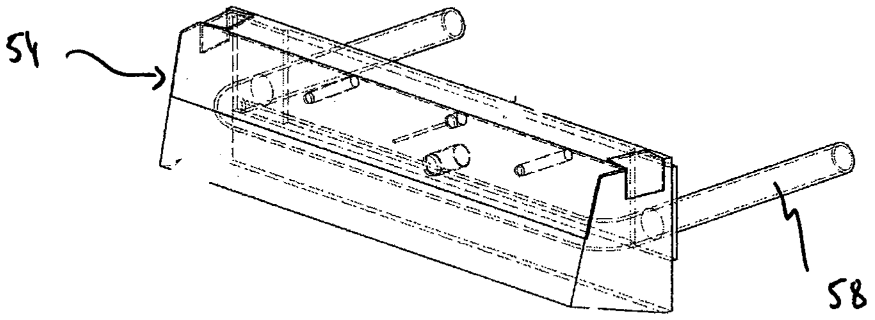
FIG. 3 is a view of a gas injection system cooling assembly with a second preferred embodiment.

FIG. 3 shows the protrusion 54 in more detail. The embodiment shows an actively cooled protrusion 54 with a conduct 58 to circulate cooling water. The cooling water may be taken from the cooling water circuit (not shown) that feeds the cooling plates and which is readily available. Alternatively, an independent circuit for the cooling water may be used.

Figure 4:
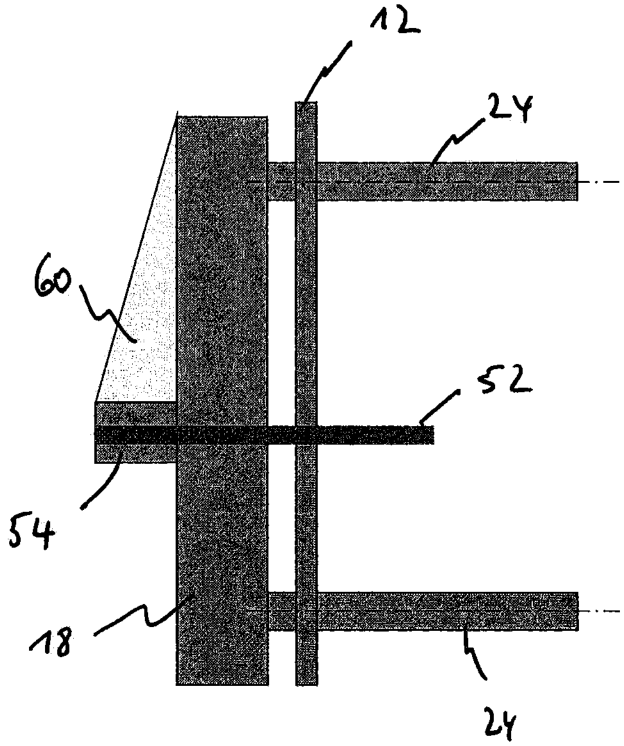
FIG. 4 is a sectional view of a cooling assembly with a second preferred embodiment.

FIG. 4 shows the protrusion 54 in more detail. The embodiment shows an actively cooled protrusion 54 attached to the hot side of a cooling plate 18. The ceramic injector shown under reference number 52 traverses the furnace wall 12 and the cooling plate 18.

On top of the protrusion 54, there is a material layer 60 which further protects the cooling plate 18 and the protrusion 54 from the injected hot gas.

In the present application, the words “blast furnace” and “shaft furnace” and “metallurgical furnace” are interchangeable.

This D type bustle pipe can be installed vertically to supply one or more row of injector, and arrange on the perimeter of the furnace to match the number of staves and thus prevent/interfere with cooling element fixing or instrumentation. The multiple vertical D type bustle pipe are linked together with the supply bustle main.

Figure 5:
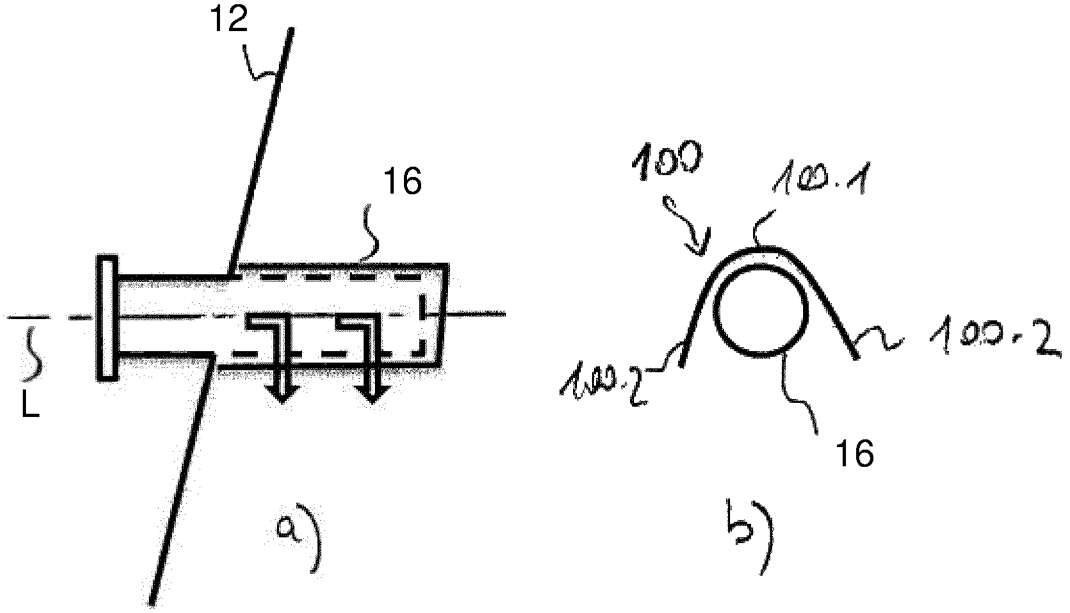
FIG. 5 is a principle diagram of a protective cover for the injector in a) side view and b) front view.

In embodiments, a protruding cover may be arranged above the injector(s) and configured to protect the nozzle body front portion that protrudes inside the furnace from a descending burden material. Such protection of the injector nozzle body against abrasion by the descending burden material (sinter/pellets and coke) can e.g. be achieved by means of a steel shell, smooth or corrugated. The principle of this protruding cover 100 is shown in FIG. 5 and forms a kind of cap extending in the injector’s longitudinal direction L. It covers the protruding length of the injector (shown in dashed lines). As can be seen, the cover 100 is a curved steel profile section, more particularly having an inverted, rounded V-shape. The apex 100.1 of the V is above the injector 16 and the two branches 100.2 extend on both lateral sides of the injector 50, optionally even below the injector. The cover 100 can be liquid cooled, directly or indirectly. Coolant channels can e.g. be arranged on the lower side of the shell.

The invention claimed is:

1. A gas injection system for a furnace or shaft furnace or metallurgical furnace, said furnace or shaft furnace or metallurgical furnace comprising a furnace wall and a cooling plate), wherein the cooling plate has a hot side, turned away from the furnace wall, wherein the gas injection system comprises:

a gas distribution pipe;

one or more injectors, each having a nozzle, the nozzle comprising a ceramic insert; and a protrusion that is attached to the hot side of said cooling plate;

wherein the ceramic insert extends from the injector and traverses the furnace wall and the cooling plate and extends through the protrusion; and wherein the ceramic inserts have a length so that they protrude inside the furnace.

2. The gas injection system for a furnace according to claim 1, wherein the protrusion is actively cooled.

3. The gas injection system for a furnace according to claim 2, wherein the protrusion is cooled by its own cooling system or through a cooling system used to cool the cooling plate.

4. The gas injection system for a furnace according to claim 1, wherein the protrusion is passively cooled.

5. The gas injection system for a furnace according to claim 1, wherein the system comprises a plurality of injectors, each having a nozzle comprising an insert, wherein the inserts have different diameters and material.

6. The gas injection system for a furnace according to claim 1, wherein each ceramic insert is accessible via a connecting port on the furnace wall.

7. The gas injection system for a furnace according to claim 1, wherein the injector is oriented perpendicular or tangentially to the furnace wall, ending at an upper middle of lower face of the protrusion.

8. The gas injection system for a furnace according to claim 1, wherein the gas distribution pipe comprises between 20 and 100 injectors.

9. The gas injection system for a furnace according to claim 1, wherein the protrusion comprises a top material layer.

10. The gas injection system for a furnace according to claim 1, wherein the gas distribution pipe is divided in several portions located around the furnace, each portion being supplied by individual hot reducing gas supply lines.

11. The gas injection system for a furnace according to claim 1, wherein a protruding cover is arranged above the injector(s) and configured to protect a front portion of a nozzle body of the injector(s) that protrudes inside the furnace from a descending burden material.

12. A metallurgic plant for producing iron products, comprising a furnace and at least one gas injection system according to claim 1.

13. A gas injection system for a furnace or shaft furnace or metallurgical furnace, said furnace or shaft furnace or metallurgical furnace comprising a furnace wall and a cooling plate, wherein the cooling plate has a hot side, turned away from the furnace wall, wherein the gas injection system comprises:

a gas distribution pipe;

one or more injectors, each having a nozzle, the nozzle comprising a ceramic insert; and a protrusion that is attached to the hot side of said cooling plate;

wherein the ceramic insert traverses the furnace wall and the cooling plate and the protrusion on cooling plate;

wherein the ceramic inserts have a length so that they protrude inside the furnace; and wherein the system comprises a plurality of injectors, each having a nozzle comprising an insert, wherein the inserts have different diameters and material.

14. A gas injection system for a furnace or shaft furnace or metallurgical furnace, said furnace or shaft furnace or metallurgical furnace comprising a furnace wall and a cooling plate, wherein the cooling plate has a hot side, turned away from the furnace wall, wherein the gas injection system comprises:

a gas distribution pipe;

one or more injectors, each having a nozzle, the nozzle comprising a ceramic insert;

a protrusion that is attached to the hot side of said cooling plate;

wherein the ceramic insert traverses the furnace wall and the cooling plate and the protrusion on cooling plate;

wherein the ceramic inserts have a length so that they protrude inside the furnace; and wherein the protrusion comprises a top material layer.

* * * * *